(12) United States Patent
Gosselin

(10) Patent No.: US 7,082,434 B2
(45) Date of Patent: Jul. 25, 2006

(54) METHOD, COMPUTER USEABLE MEDIUM, AND SYSTEM FOR ANALYZING MEDIA EXPOSURE

(76) Inventor: Gregory P. Gosselin, 7302 Weston Way Dr., Nashville, TN (US) 37221

( * ) Notice: Subject to any disclaimer, the term of this patent is extended or adjusted under 35 U.S.C. 154(b) by 446 days.

(21) Appl. No.: 10/417,081

(22) Filed: Apr. 17, 2003

(65) Prior Publication Data

US 2004/0210594 A1    Oct. 21, 2004

(51) Int. Cl.
*G06F 17/30* (2006.01)
(52) U.S. Cl. .............................. 707/100; 707/1; 707/3
(58) Field of Classification Search ............... 707/1–5, 707/100, 104.1; 705/1, 26–27
See application file for complete search history.

(56) References Cited

U.S. PATENT DOCUMENTS

| | | | | |
|---|---|---|---|---|
| 4,816,904 | A | 3/1989 | McKenna et al. ............. | 725/11 |
| 4,876,592 | A | 10/1989 | Von Kohorn ................. | 725/23 |
| 4,926,255 | A | 5/1990 | Von Kohorn ................. | 725/23 |
| 4,745,468 | A | 6/1991 | Von Kohorn ................. | 725/141 |
| 5,057,915 | A | 10/1991 | Von Kohorn ................. | 463/9 |
| 5,227,874 | A | 7/1993 | Von Kohorn ................. | 705/10 |
| 5,913,204 | A | 6/1999 | Kelly ......................... | 705/500 |
| 5,918,213 | A * | 6/1999 | Bernard et al. ............... | 705/26 |
| 6,286,140 | B1 | 9/2001 | Ivanyi ......................... | 725/14 |
| 6,298,328 | B1 | 10/2001 | Healy et al. .................. | 705/10 |
| 6,415,291 | B1 | 7/2002 | Bouve et al. ................. | 707/10 |
| 6,446,045 | B1 | 9/2002 | Stone et al. .................. | 705/26 |
| 6,526,351 | B1 * | 2/2003 | Whitham ..................... | 701/211 |
| 6,572,662 | B1 * | 6/2003 | Manohar et al. ............. | 715/526 |
| 2002/0066358 | A1 | 6/2002 | Hasegawa et al. ............ | 84/609 |
| 2002/0120501 | A1 | 8/2002 | Bell et al. ..................... | 705/14 |
| 2002/0123924 | A1 | 9/2002 | Cruz ........................... | 705/10 |
| 2002/0124077 | A1 | 9/2002 | Hill et al. .................... | 709/224 |
| 2002/0124246 | A1 | 9/2002 | Kaminsky et al. ............ | 725/9 |
| 2002/0133817 | A1 | 9/2002 | Markel ........................ | 725/23 |
| 2002/0138630 | A1 | 9/2002 | Solomon et al. ............ | 709/228 |
| 2002/0143607 | A1 | 10/2002 | Connelly .................... | 705/10 |
| 2002/0156684 | A1 | 10/2002 | Stone et al. ................. | 705/22 |

(Continued)

FOREIGN PATENT DOCUMENTS

GB    1287304    8/1972

(Continued)

OTHER PUBLICATIONS

Internet web page at http://www.v-soft.com/nbt/default.asp, printed on Dec. 18, 2002.

(Continued)

*Primary Examiner*—Greta Robinson
*Assistant Examiner*—Cheryl Lewis
(74) *Attorney, Agent, or Firm*—Richard C. Litman

(57) ABSTRACT

A method, computer useable medium, and/or system for analyzing media exposure that generates databases of retail location parameters, generates databases of media parameters, generates databases of exposure factors associated with an entity, executes relational queries that correlate the exposure factors with the media parameters, and develops lists of retail locations from the executed relational queries. The retail location and/or media parameter databases may include a radio technical database, a radio zip code map database, a venue database, a venue zip code map database, a video technical database, a video zip code map database, a sales market database, a sales market zip code map database, a retail location database, or the like. The databases of exposure factors may include a key market database, a radio tracking database, a video tracking database, a tour database, a project database, or the like.

20 Claims, 3 Drawing Sheets

U.S. PATENT DOCUMENTS

| | | | |
|---|---|---|---|
| 2002/0161764 A1 | 10/2002 | Sharo | 707/7 |
| 2002/0184069 A1 | 12/2002 | Kosiba et al. | 705/8 |
| 2002/0188746 A1 | 12/2002 | Drosset et al. | 709/231 |

FOREIGN PATENT DOCUMENTS

| | | |
|---|---|---|
| WO | WO 01/80122 | 10/2001 |

OTHER PUBLICATIONS

Internet web page at http://www.nielsenmedia.com/services.html, printed on Dec. 18, 2002.

Internet web page at http://www.nielson.com/nielsen_media_research.html, printed on Dec. 18, 2002.

\* cited by examiner

METHOD, COMPUTER USEABLE MEDIUM, AND SYSTEM FOR ANALYZING MEDIA EXPOSURE

BACKGROUND OF THE INVENTION

1. Field of the Invention

The present invention relates generally to information services and, more particularly, to a method, computer useable medium, and/or system for analyzing media exposure.

2. Description of the Related Art

There are many factors that can drive album sales, such as hit development, image and artist visibility, consumer buzz, touring, the residual equity of a marquee artist, feature film exposure, etc. However, time has proven that hit development is the most common and efficient technique for creating music product demand. As a result, record companies compete fiercely to promote their content to key national and major market media outlets, and gain the exposure necessary to drive demand for album sales and airplay chart (e.g., Billboard, R&R, etc.) activity.

The music industry generally utilizes a tricky "hit" or "miss" technique where promotional music or video content is provided to mass media outlets, typically radio stations and music video channels. Unlike most business models in which a company exercises a high level of control over the mass media exposure for its products through advertising buys and other marketing directives, the music business model necessitates a blanketing of appropriate mass media outlets with this promotional content in the hopes that the media outlets will utilize the promotional content as part of their programming. The process of developing a "hit" from promotional content is both an art and a science as record companies promote the promotional content to media outlets in order to gain the repeated exposure necessary ("spins") to drive demand for bulk album sales. Spins are tracked for the major market media outlets by a number of companies, including Broadcast Data Systems (a division of Nielsen Entertainment) and MediaBase (a division of Music Information Systems). Record promoters who speak with media outlet programmers on a regular basis can also track spins, although the quality of this information may be less accurate.

Major market media outlets and "chart reporters" are always the primary promotional focus of record companies. Their impact on album sales is much easier to identify and on which to capitalize. Record companies generally have limited marketing resources and focus promotional and marketing efforts where they think they can achieve the highest level of album sales. In addition, because most of these major market media outlets are chart reporters, they affect the positive movement of songs on the airplay charts.

Positive airplay chart activity stimulates additional airplay exposure at secondary and tertiary media outlets who generally use the published airplay charts as guides for programming decisions. Secondary and tertiary media outlets continue to be mostly ignored because the media exposure created by them has typically been difficult for record companies to gauge and exploit.

Because music purchases are generally based upon an emotional response of some sort, there is no guarantee of how well consumers will react to the media exposure of promotional material. Album sales are the primary means by which record companies currently derive income. Record companies do not receive royalties from the airing of promotional material, so it is critical that they have product distributed adequately to retail locations in areas where there is adequate exposure.

An accurate initial allocation is critical on new albums with anticipated initial orders of 25,000 units or less. In today's music business environment, a bad initial allocation can miss potential sales, damage an artist's credibility, and be difficult to correct without a subsequent major "hit".

At the retail level, record companies compete through price and positioning programs. This is similar to competition in many other industries, except that there is usually only a short window of opportunity created by mass media exposure in which pricing/positioning programs need to be timed in order to achieve maximum sell-through. It is key for record companies, especially those with developing hits and artists, to have a strong distribution arm that is able to get product into the appropriate locations during this window of opportunity.

For product distribution, record companies generally operate on a "push" distribution philosophy where large quantities of music product are shipped into the distribution channel once promotional efforts to media outlets are well under way. It is assumed that the distributors and retailers are capable of placing the product in the correct retail outlets to capitalize on the current media exposure. For albums shipping hundreds of thousands (or millions of albums) this philosophy works fairly well because of widespread demand and the quantity of product in the distribution pipeline. But for the niche and developing artists shipping, for instance, 25,000 or less units into the marketplace (the vast majority of releases), this philosophy can result in inaccurate product coverage, especially if the title is not a priority for the label or distribution company. This can result in lost sales and stale inventory when the various windows of active media exposure are missed. In the music industry, stale inventory units (called "returns") are ultimately sent back to the record companies for a refund, and are viewed as an outstanding liability.

One of the other distribution options is for the record company to work in tight conjunction with its distributor and customers to micro market music product according to exposure factors and place the product in locations that represent the best potential for demand. By placing product in locations that represent the best potential for demand, the ability to capitalize on media exposure is maximized, and the risk of returns can be minimized. However, this process has always been labor and time-intensive, and difficult to achieve adequately beyond specific exposure situations or a small handful of markets at a time.

Artist touring is also a time-proven method of stimulating demand for music product. The principle is the same for taking advantage of potentially increased demand—place artist music product in retail locations that best represent the sales potential of the music product due their proximity to a personal appearance venue.

When developing a music product distribution plan, the residual equity of an artist is also a factor to consider. The music industry generally places special emphasis on key high sales markets or markets where the artist has developed a fan base through previous radio airplay and/or touring exposure. Historical market-by-market sales trend data is usually available from either a past distributor or a music product data service such as Nielsen SoundScan.

A need exists to provide a method, computer useable medium, and/or system for analyzing media exposure to assist product development teams in focusing their sales and marketing efforts on key areas of market exposure, to help management entities make informed decisions on how and where to allocate sales and marketing budgets, and to help maximize the ability to capitalize on promotional exposure.

The related art is represented by the following references of interest.

U.S. Patent Application Publication No. 2002/0066358 A1, published on Jun. 6, 2002 for Yutaka Hasegawa et al., describes a method, system, and recording medium for viewing/listening evaluation of musical performance. The Hasegawa et al. application does not suggest a method, computer useable medium, and/or system for analyzing media exposure according to the claimed invention.

U.S. Patent Application Publication No. 2002/0120501 A1, published on Aug. 29, 2002 for Christopher N. Bell et al., describes a system and method for measuring, evaluating, and reporting audience response to audio, video, and other content. The Bell et al. application does not suggest a method, computer useable medium, and/or system for analyzing media exposure according to the claimed invention.

U.S. Patent Application Publication No. 2002/0123924 A1, published on Sep. 5, 2002 for Benjamin G. Cruz, describes a method for gathering local demand data for entertainment performances. The Cruz application does not suggest a method, computer useable medium, and/or system for analyzing media exposure according to the claimed invention.

U.S. Patent Application Publication No. 2002/0124077 A1, published on Sep. 5, 2002 for Clarke R. Hill et al., describes a traffic authentication method and related computer-implemented software that provide authenticated-information about audio or video program traffic transmitted over a computer network from a media server. The Hill et al. application does not suggest a method, computer useable medium, and/or system for analyzing media exposure according to the claimed invention.

U.S. Patent Application Publication No. 2002/0124246 A1, published on Sep. 5, 2002 for David L. Kaminsky et al., describes methods, systems, and program products for tracking information distribution. The Kaminsky et al. application does not suggest a method, computer useable medium, and/or system for analyzing media exposure according to the claimed invention.

U.S. Patent Application Publication No. 2002/0133817 A1, published on Sep. 19, 2002 for Steven O. Markel, describes affinity marketing for interactive media systems. The Markel application does not suggest a method, computer useable medium, and/or system for analyzing media exposure according to the claimed invention.

U.S. Patent Application Publication No. 2002/0138630 A1, published on Sep. 26, 2002 for Barry M. Solomon et al., describes a music scheduling algorithm for programmatically and dynamically creating a unique play list for each listener of an Internet radio service. The Solomon et al. application does not suggest a method, computer useable medium, and/or system for analyzing media exposure according to the claimed invention.

U.S. Patent Application Publication No. 2002/0124246 A1, published on Oct. 3, 2002 for Jay H. Connelly, describes a system and method for transparently obtaining customer preferences to refine product features or marketing focus. The Connelly application does not suggest a method, computer useable medium, and/or system for analyzing media exposure according to the claimed invention.

U.S. Patent Application Publication No. 2002/0156684 A1, U.S. Pat No. 6,873,969 published on Oct. 24, 2002, and U.S. Pat. No. 6,446,045 B1, issued on Sep. 3, 2002, for Lucinda Stone et al., describe a method for using computers to facilitate and control the creating of a plurality of functions. The Stone et al. application does not suggest a method, computer useable medium, and/or system for analyzing media exposure according to the claimed invention.

U.S. Patent Application Publication No. 2002/0161764 A1, published on Oct. 31, 2002 for Linda Sharo, describes a marketing management method and a system to manage interactions, develop base line for the current performance, analyze various marketing strategies, and select a desirable marketing strategy for implementation. The Sharo application does not suggest a method, computer useable medium, and/or system for analyzing media exposure according to the claimed invention.

U.S. Patent Application Publication No. 2002/0184069 A1, published on Dec. 5, 2002 for Eric Kosiba et al., describes a system and method for predicting expected performance of a processing center. The Kosiba et al. application does not suggest a method, computer useable medium, and/or system for analyzing media exposure according to the claimed invention.

U.S. Patent Application Publication No. 2002/0188746 A1, published on Dec. 12, 2002 for Joseph Drossett et al., describes a system and method for audience measurement. The Drossett et al. application does not suggest a method, computer useable medium, and/or system for analyzing media exposure according to the claimed invention.

U.S. Reexamination Certificate No. B1 4,745,468, and U.S. Pat. Nos. 4,876,592, 4,926,255, and 5,057,915, issued on Jun. 11, 1991, Oct. 24, 1989, May 15, 1990, and Oct. 15, 1991, respectively, to Henry Von Kohorn, describe a system for evaluating responses to broadcast programs. The Von Kohorn certificate and the Von Kohorn '592, '255, and 915 patents do not suggest a method, computer useable medium, and/or system for analyzing media exposure according to the claimed invention.

U.S. Pat. No. 4,816,904, issued on Mar. 28, 1989 to William J. McKenna et al., describes a television and market research data collection system and method. The McKenna et al. patent does not suggest a method, computer useable medium, and/or system for analyzing media exposure according to the claimed invention.

U.S. Pat. No. 5,227,874, issued on Jul. 13, 1993 to Henry Von Kohorn, describes a method for measuring the effectiveness of stimuli on the decisions of shoppers. The Von Kohorn '874 patent does not suggest a method, computer useable medium, and/or system for analyzing media exposure according to the claimed invention.

U.S. Pat. No. 5,913,204, issued on Jun. 15, 1999 to Thomas L. Kelly, describes a method and apparatus for surveying and reporting listener opinion of a list of songs. The Kelly patent does not suggest a method, computer useable medium, and/or system for analyzing media exposure according to the claimed invention.

U.S. Pat. No. 6,286,140 B1, issued on Sep. 4, 2001 to Thomas P. Ivanyi, describes a system and method for measuring and storing information pertaining to television viewer or user behavior. The Ivanyi patent does not suggest a method, computer useable medium, and/or system for analyzing media exposure according to the claimed invention.

U.S. Pat. No. 6,298,328 B1, issued on Oct. 8, 2001 to Eileen M. Healy et al., describes an apparatus, method, and system for sizing markets. The Healy et al. patent does not suggest a method, computer useable medium, and/or system for analyzing media exposure according to the claimed invention.

U.S. Pat. No. 6,415,291 B2, issued on Jul. 2, 2002 to W. Lincoln Bouve et al., describes a system and method for remotely accessing a selected group of items of interest from a database. The Bouve et al. patent does not suggest a method, computer useable medium, and/or system for analyzing media exposure according to the claimed invention.

Great Britain Patent Application Publication No. 1,287,304, published on Aug. 31, 1972, describes educational television systems. The Great Britain application does not suggest a method, computer useable medium, and/or system for analyzing media exposure according to the claimed invention.

World Intellectual Property Organization (WIPO) Patent Application Publication No. WO 01/80122 A2, published on Oct. 25, 2001, describes an interactive system for conducting business and a method for the interactive distribution of information relating to products and services. The WIPO application does not suggest a method, computer useable medium, and/or system for analyzing media exposure according to the claimed invention.

An Internet web page at http://www.v-soft.com/nbt/default.asp, printed on Dec. 18, 2002, shows a zip code query that results in a list of FM stations serving the area of the zip code. The v-soft web page does not suggest a method, computer useable medium, and/or system for analyzing media exposure according to the claimed invention.

An Internet web page at http://www.nielsenmedia.com/services.html, printed on Dec. 18, 2002, describes services of Nielsen Media Research. This Nielsen Media web page does not suggest a method, computer useable medium, and/or system for analyzing media exposure according to the claimed invention.

An Internet web page at http://www.nielson.com/nielsen_media_research.html, printed on Dec. 18, 2002, describes information about Nielsen Media Research. This Nielsen Media web page does not suggest a method, computer useable medium, and/or system for analyzing media exposure according to the claimed invention.

None of the above inventions and patents, taken either singularly or in combination, is seen to describe the instant invention as claimed.

SUMMARY OF THE INVENTION

The present invention is a method, computer useable medium, and/or system for analyzing media exposure. Analyzing media exposure according to the invention involves generating databases of retail location parameters and media parameters, as well as generating databases of exposure factors associated with an entity. The entity may be any business or entrepreneur who markets products and/or goods to the public. The retail location and/or media parameter databases may include a radio technical database, a radio zip code map database, a venue database, a venue zip code map database, a video technical database, a video zip code map database, a sales market database, a sales market zip code map database, a retail location database, or the like. Analyzing media exposure according to the invention also involves generating databases of exposure factors associated with the entity. The exposure factor databases may include a key market database, a radio tracking database, a video tracking database, a tour database, a project database, or the like. Relational queries are then executed that correlate the exposure factors with the media parameters, and develop lists of retail locations from the executed relational queries.

Accordingly, it is a principal aspect of the invention to provide a method for analyzing media exposure that generates databases of retail location parameters, generates databases of media parameters, generates databases of exposure factors associated with an entity, executes relational queries that correlate the exposure factors with the media parameters, and develops lists of retail locations from the executed relational queries.

It is another aspect of the present invention to provide a method for analyzing media exposure that generates databases of retail location parameters; generates databases of media parameters; generates databases of exposure factors associated with an entity; executes a media exposure relational query that correlates exposure factors from a radio tracking database and a project database, with media parameters from a radio zip code map database to create first correlations, calculates an impact score for each of the first correlations, and produces a first data file containing result records; executes a tour exposure relational query that correlates exposure factors from a tour database and the project database, with media parameters from a venue zip code map database to create second correlations, assigns an impact score for each of the second correlations, and produces a second data file containing result records; executes a video exposure relational query that correlates exposure factors from a video tracking database and the project database, with media parameters from a video zip code map database to create third correlations, calculates an impact score for each of the third correlations, and produces a third data file containing result records; executes a sales market relational query that correlates exposure factors from a key market database and the project database, with media parameters from a sales market zip code map database to create fourth correlations, assigns an impact score for each of the fourth correlations, and produces a fourth data file containing result records; executes a totaling query for the result records from the first data file to produce a fifth data file containing result records for predetermined field combinations; executes a totaling query for the result records from the second data file to produce a sixth data file containing result records for predetermined field combinations; executes a totaling query for the result records from the third data file to produce a seventh data file containing result records for predetermined field combinations; combines the result records from the fourth, fifth, sixth, and seventh data files into an eighth data file containing result records; executes a totaling query for the result records from the eighth data file to produce a ninth data file containing result records for predetermined field combinations; executes a relational query that correlates the result records of the ninth data file with retail location parameters from the retail location databases to produce a tenth data file containing result records; and calculates an indexed impact score for each of the result records of the tenth data file to produce a final data file.

It is a further aspect of the present invention to provide a computer useable medium or media exposure analyzing system carrying media exposure analyzing software which causes a processor to generate databases of retail location parameters, generate databases of media parameters, generate databases of exposure factors associated with an entity, execute relational queries that correlate the exposure factors with the media parameters, and develop lists of retail locations from the executed relational query.

Still another aspect of the present invention is to provide a computer useable medium or media exposure analyzing system carrying media exposure analyzing software which causes a processor to generate databases of retail location parameters; generate databases of media parameters; generate databases of exposure factors associated with an entity; execute a media exposure relational query that correlates exposure factors from a radio tracking database and a project database, with media parameters from a radio zip code map database to create first correlations, calculates an impact score for each of the first correlations, and produces a first data file containing result records; execute a tour exposure relational query that correlates exposure factors from a tour database and the project database, with media parameters from a venue zip code map database to create second correlations, assigns an impact score for each of the second correlations, and produces a second data file containing result records; execute a video exposure relational query that correlates exposure factors from a video tracking database and the project database, with media parameters from a video zip code map database to create third correlations, calculates an impact score for each of the third correlations, and produces a third data file containing result records; execute a sales market relational query that correlates exposure factors from a key market database and the project database, with media parameters from a sales market zip code map database to create fourth correlations, assigns an impact score for each of the fourth correlations, and produces a fourth data file containing result records; execute a totaling query for the result records from the first data file to produce a fifth data file containing result records for predetermined field combinations; execute a totaling query for the result records from the second data file to produce a sixth data file containing result records for predetermined field combinations; execute a totaling query for the result records from the third data file to produce a seventh data file containing result records for predetermined field combinations; combine the result records from the fourth, fifth, sixth, and seventh data files into an eighth data file containing result records; execute a totaling query for the result records from the eighth data file to produce a ninth data file containing result records for predetermined field combinations; execute a relational query that correlates the result records of the ninth data file with retail location parameters from the retail location databases to produce a tenth data file containing result records; and calculate an indexed impact score for each of the result records of the tenth data file to produce a final data file.

It is an aspect of the invention to provide improved elements and arrangements thereof in a method, computer useable medium, and/or system for analyzing media exposure for the purposes described which is relatively quick, inexpensive, dependable, and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
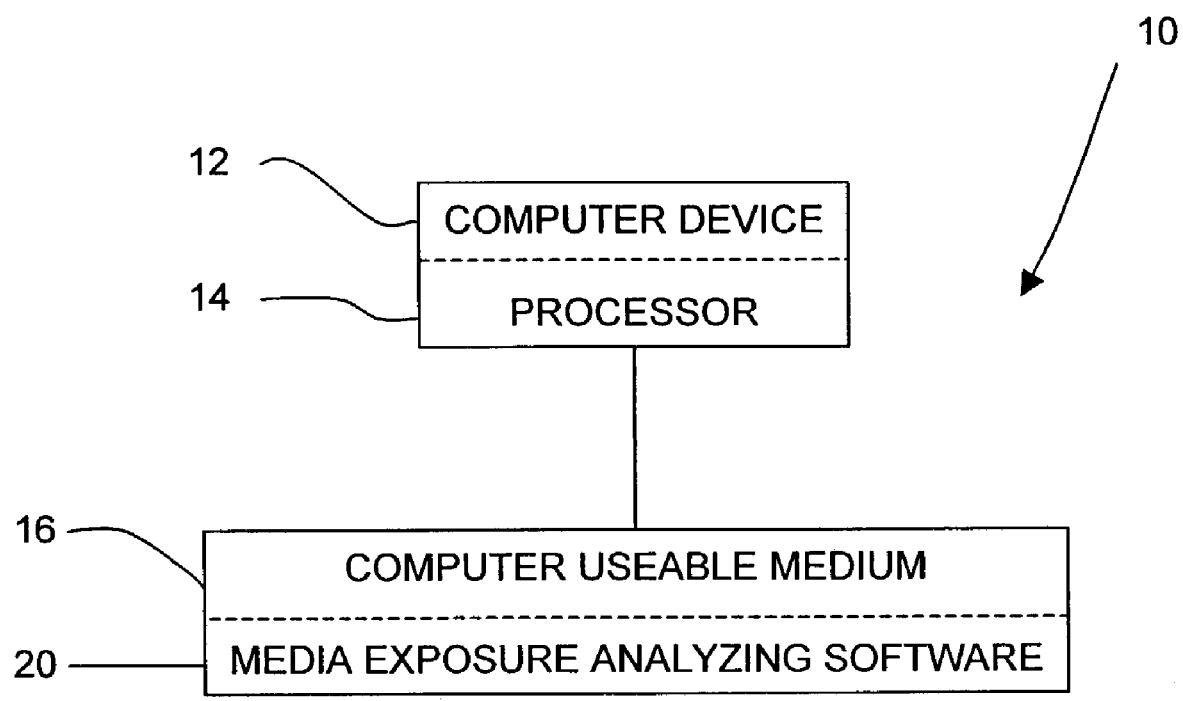
FIG. 1 is a block diagram of a media exposure analyzing system according to the present invention.

The present invention is a method, computer useable medium, and/or system for analyzing media exposure. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawings, FIG. 1 shows a system 10 for analyzing media exposure that includes a computer device 12 and a computer useable medium 16 containing embodied thereon media exposure analyzing software 20. The computer device 12 may be a wireless or non-wireless palm-top, lap-top, personal computer, workstation, or any other similar configured computer device. The computer device may execute standard operating system software, such as Windows 98, 2000, XP, UNIX, or the like. The operating system software is used to execute application software programs.

The media exposure analyzing software 20 includes a plurality of computer instructions which may be carried on any computer useable medium according to the desires of the user, such as a computer hard drive, a floppy disk, Flash memory, optical memory, magnetic media memory, or the like.

Figure 2:
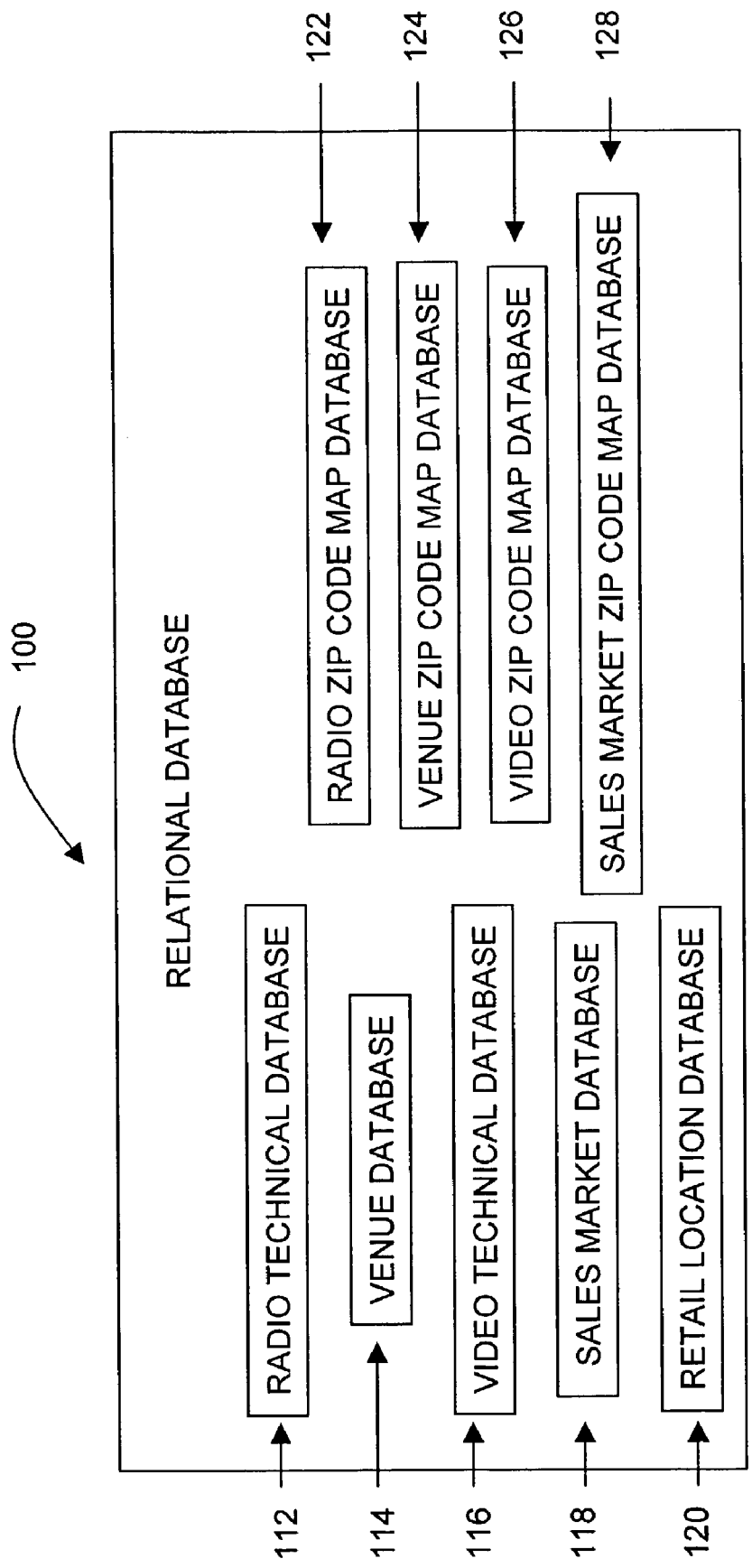
FIG. 2 is a block diagram of relational database main database files (media parameters and retail location parameters) of a media exposure analyzing system according to the present invention.

Analyzing media exposure according to the invention involves generating databases of retail location parameters and media parameters, as well as generating databases of exposure factors associated with an entity. The description provided below is directed toward an entity associated with the music industry, however, the entity may be any business or entrepreneur who markets products and/or goods to the public. As shown in FIG. 2, the media exposure analyzing software generates a relational database of retail location and media parameter databases 100. The retail location and/or media parameter databases may include a radio technical database 112, a radio zip code map database 122, a venue database 114, a venue zip code map database 124, a video technical database 116, a video zip code map database 126, a sales market database 118, a sales market zip code map database 128, a retail location database 120, or the like.

The radio technical database 112 has fields that may include program calls, program band, call sign, service type, radio frequency, city of license, state of license, or the like. The radio technical database 112 may also include radio engineering specifications for transmitters of radio stations in fields such as latitude, longitude, modulation type (amplitude modulation (AM) or frequency modulation (FM)), transmitter power, local terrain, atmospheric conditions, antenna height, antenna directionality, frequency, or the like. Signal coverage of various transmitters for a radio station may be predicted based on the radio engineering specifications. Any known propagation model, such as Longley/Rice, Shadow, Okumara/Hata/Davidson, FCC Curves, or the like, may be used to develop visual overlays or "distance to contour" calculations for spatial analysis that approximate the signal coverage areas for each transmitter location or an associated group (e.g., one set of "program calls") of transmitters. For example, if a radio transmitter uses a directional antenna, directional specifications may be used to approximate the directional pattern of the antenna, and visual overlays may be created for spatial analysis. Radio tower engineering data, as well as accepted engineering formulas and field strength charts, may be used to calculate signal propagation and coverage areas for individual transmitter signals. Each unique call sign may be assigned with a program calls/program band designation that represents the programming being broadcast from a particular radio transmitter. More than one call sign may be assigned the same program calls if there is more than one transmitting location for the programming source. A unique program band, such as FM, FM1, FM2, or the like, may be designated for each transmitting location with the same program calls.

The radio zip code map database 122 has fields that may include program calls, program band, zip code, impact area designation, or the like. The radio zip code map database 122 is developed through a spatial analysis of radio engineering data and radio wave propagation models for the call signs of the radio technical database, and represents relationships between program calls/program band combinations and each zip code predicted to be within a primary coverage area and/or secondary coverage areas. In addition, roadway data and clusters of music retail locations outside the secondary coverage areas may be taken into account. In areas of sparse retail coverage by a radio station, consideration may be taken that retail may be affected outside of the radio station's primary or secondary coverage areas, especially at retail clusters, such as mall locations, along major roadways outside of a secondary coverage area or in nearby population centers. Corresponding additional program calls and zip code relationships may be added into the radio zip code map database 122 accordingly.

The venue database 114 has fields that may include venue identification (id), venue name, venue address, venue city, venue state, venue zip code, venue phone number, or the like. The venue database 114 represents physical addresses or latitude/longitude for venues being profiled. A unique venue id is generated for each venue. The venue zip code map database 124 has fields that may include venue id, zip code, impact area designation, or the like. The venue zip code map database 124 represents relationships between each unique venue id and each zip code predicted to be within a primary marketing area and/or secondary marketing areas.

The video technical database 116 has fields that may include video network name, video network address, video network city, video network state, video network zip code, or the like. The video zip code map database 126 has fields that may include video network name, zip code, impact area designation, or the like. The video zip code map database 126 represents relationships between each video network and each zip code predicted to be within a primary impact area and/or secondary impact areas.

The sales market database 118 has fields that may include sales market id, sales market name, other sales marketing data parameters, or the like. The sales market zip code map database 128 has fields that may include zip code, sales market id, or the like. The sales market zip code map database 128 represents the relationship between each sales market id and zip code considered to be within the confines of each sales market.

The retail location database 120 has fields that may include sales account name, store name, location number, store address, store city, store state, store zip code, store phone number, genre indexes, or the like. The retail location database 120 includes address information and available marketing data for a desired sample of retail locations.

Figure 3:
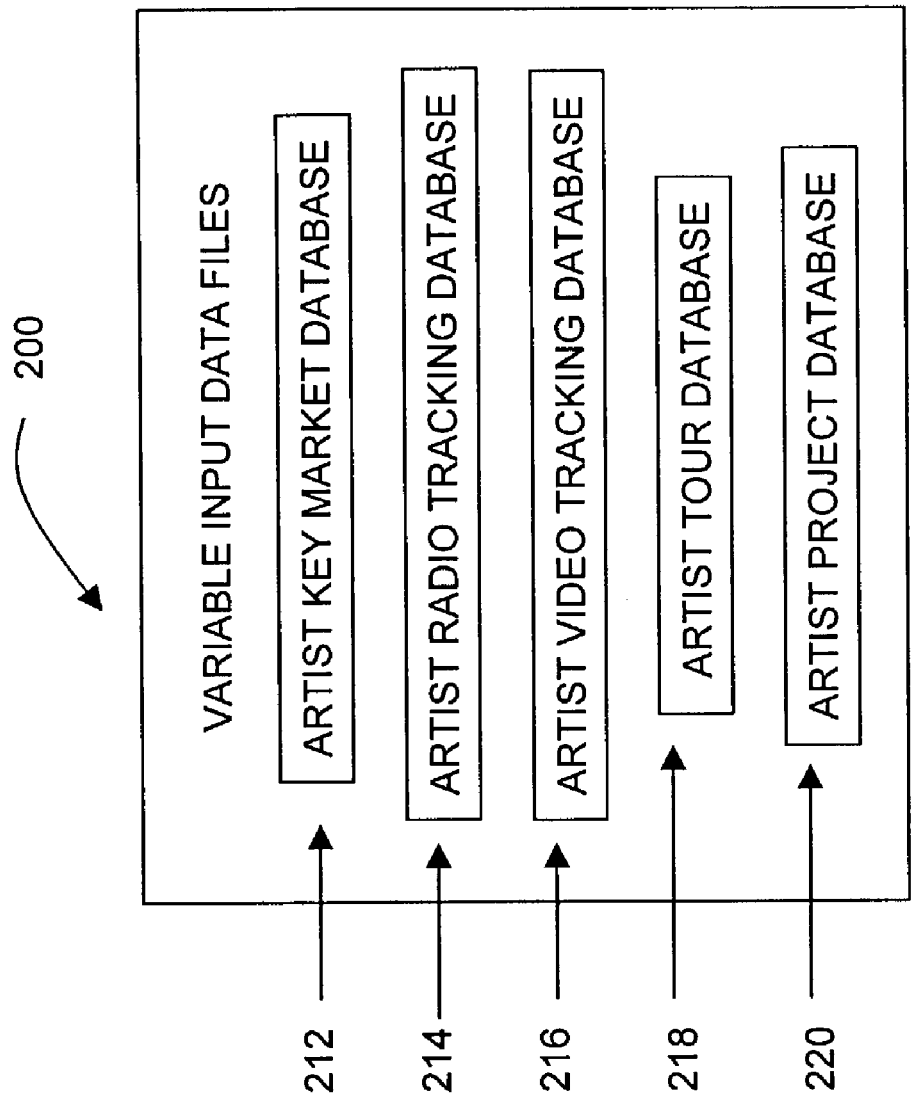
FIG. 3 is a block diagram of variable input data files (exposure factors) of a media exposure analyzing system according to the present invention.

As shown in FIG. 3, the media exposure analyzing software 20 also generates variable input data files 200 of exposure factors that may include an artist key market database 212, an artist radio tracking database 214, an artist video tracking database 216, an artist tour database 218, an artist project database 220, or the like. These variable input data files are associated with the music industry, however, these data files may be configured for the needs of any industry in which products and/or goods are marketed to the public.

The artist key market database 212 has fields that may include artist, sales market id, sales market name, sales market rank, date of update, or the like. The artist radio tracking database 214 has fields that may include period ending date, artist, song title, program calls, program band, song spins, or the like. The artist video tracking database 216 has fields that may include period ending date, artist, song title, video network name, song/video spins, or the like. The artist tour database 218 has fields that may include artist, appearance date, venue id, or the like. The artist project database 220 has fields that may include artist, song title, album title, record company, catalog number, or the like.

Relational queries are executed for analyzing media exposure that correlate exposure factors with media parameters, calculate or assign an impact score for each of the correlations, and produce data files containing result records. A media exposure relational query is executed that correlates exposure factors from the artist radio tracking database 214 and the artist project database 220, with media parameters from the radio zip code map database 122 to create correlations. An impact score is then calculated for each of these correlations by multiplying a correlated field, such as song spins or the like, by a predetermined, query-assigned value for a correlated field, such as impact area designation or the like. Result records are then produced for the executed media exposure relational query. These result records have fields that may include artist, album title, zip code, impact score, or the like. A tour exposure relational query is executed that correlates exposure factors from the artist tour database 218 and the artist project database 220, with media parameters from the venue zip code map database 124 to create correlations. An impact score is then assigned for each of these correlations by assigning each of these correlations a predetermined, query-assigned value for a correlated field, such as impact area designation or the like. Result records are then produced for the executed tour exposure relational query. These result records have fields that may include artist, album title, zip code, impact score, or the like. A video exposure relational query is executed that correlates exposure factors from the artist video tracking database 216 and the artist project database 220, with media parameters from the video zip code map database 126 to create correlations. An impact score is then calculated for each of these correlations by multiplying a correlated field, such as song/video spins or the like, by a predetermined, query-assigned value for a correlated field, such as impact area designation or the like. Result records are then produced for the executed video exposure relational query. These result records have fields that may include artist, album title, zip code, impact score, or the like. Finally, a sales market relational query is executed that correlates exposure factors from the artist key market database 212 and the artist project database 220, with media parameters from the sales market zip code map database 128 to create correlations. An impact score is then assigned for each of these correlations by assigning each of these correlations a predetermined, query-assigned value. Result records are then produced for the executed sales market relational query. These result records have fields that may include artist, album title, zip code, impact score, or the like.

Totaling queries are then executed for result records of the data files of several of the executed relational queries to produce data files satisfying predetermined criteria. A totaling query is executed for the result records from the executed media exposure relational query to produce a data file containing result records of predetermined field combinations, such as an artist, album title, and zip code combination, or the like. Each result record of these particular result records may correspond to one particular combination of artist, album title, and zip code fields. The impact scores for result records from the executed media exposure relational query that satisfy that one particular combination of artist, album title, and zip code fields are totaled and an individual result record is produced for that particular combination. That result record also includes a totaled impact score field that is the sum of the impact scores for result records from the executed media exposure relational query that satisfy that one particular combination of artist, album title, and zip code fields. A totaling query is executed for the result records from the executed tour exposure relational query to produce a data file containing result records of predetermined artist, album title, and zip code field combinations, or the like. A totaling query is executed for the result records from the executed video exposure relational query to produce a data file containing-result records of predetermined artist, album title, and zip code field combinations, or the like.

The result records from the executed sales market relational query and the executed totaling queries for the result records from the executed media exposure, tour exposure, and video exposure relational queries are then combined into another data file. A totaling query is then executed on this data file to produce a data file containing result records of predetermined artist, album title, and zip code field combinations, or the like. Each result record of these particular result records corresponds to one particular combination of artist, album title, and zip code fields. Each result record also includes a totaled impact score field that is the sum of the impact scores for result records from the associated executed relational or totaling queries that satisfy that one particular combination of artist, album title, and zip code fields.

A relational query is then executed that correlates the result records from the executed totaling query that totaled result records combined from the executed sales market relational query and the executed totaling queries for the result records from the executed media exposure, tour exposure, and video exposure relational queries with retail location parameters from the retail location database to produce another data file containing result records.

An indexed impact score is then calculated for each of the result records of the data file produced by the executed relational query that correlated the result records from the executed totaling query that totaled result records combined from the executed sales market relational query and the executed totaling queries for the result records from the executed media exposure, tour exposure, and video exposure relational queries with retail location parameters from the retail location database. The indexed impact score is calculated by multiplying a correlated field, such as impact score or the like, by another correlated field, such as genre index or the like. A final data file is then produced.

Result records of this final data file have fields that may include artist, album title, store name, location number, indexed impact score, or the like. For each result record, the indexed impact score may represent a strength of relationship rating between the store name/location number combination and the exposure factors for the entity.

Additionally, the final data file may contain the minimum data fields necessary for linking back to the various database files in order to report the results of the final data file in additional depth. For example, a query may be run that correlates the results of the final data file with the retail location parameters of the retail location database. Result records may have fields including artist, album title, store name, location number, indexed impact score, or the like, as well as additional fields that may include store address, store city, store state, or the like.

By developing timely, accurate, and "easy-to-act-upon" data, the above described method, computer useable medium, and/or system for analyzing media exposure may assist a product distribution team in focusing their sales and marketing efforts on the key areas of product mass media exposure. The method, computer useable medium, and/or system for analyzing media exposure may also help management teams make informed decisions on how and where to allocate sales and marketing budgets, and help maximize the ability to capitalize on promotional exposure. The method, computer useable medium, and/or system for analyzing media exposure may be used by a person or company providing information services to any business industry, such as the music industry or the like, that utilizes mass media outlet exposure in order to stimulate demand for products and/or goods.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A computer implemented method for analyzing media exposure comprising steps of:
generating at least one database of retail locations;
generating at least one database of media parameters, said database of media parameters containing data associated with mediums of exposure employed in marketing an entity;
generating at least one database of exposure factors associated with the entity;
executing at least one relational query that correlates the exposure factors with the media parameters; and
developing at least one list of retail locations from said step of executing at least one relational query.

2. The method for analyzing media exposure according to claim 1, wherein said step of generating at least one database of media parameters includes the steps:
generating a radio technical database;
generating a radio zip code map database;
generating a venue database;
generating a venue zip code map database
generating a video technical database;
generating a video zip code map database;
generating a sales market database; and
generating a sales market zip code map database.

3. The method for analyzing media exposure according to claim 2, wherein said step of generating at least one database of exposure factors associated with the entity includes the steps:
generating a key market database;
generating a radio tracking database;
generating a video tracking database;

generating a tour database; and
generating a project database.

4. The method for analyzing media exposure according to claim 3, wherein said step of executing at least one relational query that correlates the exposure factors with the media parameters further comprises:

executing a media exposure relational query that correlates exposure factors from the radio tracking database and the project database, with media parameters from the radio zip code map database to create first correlations, calculates an impact score for each of the first correlations, and produces a first data file containing result records;

executing a tour exposure relational query that correlates exposure factors from the tour database and the project database, with media parameters from the venue zip code map database to create second correlations, assigns an impact score for each of the second correlations, and produces a second data file containing result records;

executing a video exposure relational query that correlates exposure factors from the video tracking database and the project database, with media parameters from the video zip code map database to create third correlations, calculates an impact score for each of the third correlations, and produces a third data file containing result records; and executing a sales market relational query that correlates exposure factors from the key market database and the project database, with media parameters from the sales market zip code map database to create fourth correlations, assigns an impact score for each of the fourth correlations, and produces a fourth data file containing result records.

5. The method for analyzing media exposure according to claim 4, wherein said step of executing at least one relational query that correlates the exposure factors with the media parameters further comprises:

executing a totaling query for the result records from the first data file to produce a fifth data file containing result records for predetermined field combinations;

executing a totaling query for the result records from the second data file to produce a sixth data file containing result records for predetermined field combinations; and executing a totaling query for the result records from the third data file to produce a seventh data file containing result records for predetermined field combinations.

6. The method for analyzing media exposure according to claim 5, wherein said step of executing at least one relational query that correlates the exposure factors with the media parameters further comprises:

combining the result records from the fourth, fifth, sixth, and seventh data files into an eighth data file containing result records; and executing a totaling query for the result records from the eighth data file to produce a ninth data file containing result records for predetermined field combinations.

7. The method for analyzing media exposure according to claim 6, wherein said step of developing at least one list of retail locations from said step of executing at least one relational query further comprises:

executing a relational query that correlates the result records of the ninth data file with retail locations from the at least one database of retail locations to produce a tenth data file containing result records; and calculating an indexed impact score for each of the result records of the tenth data file to produce a final data file.

8. A computer useable medium carrying media exposure analyzing software which, when executed by a processor, causes the processor to carry out steps comprising:

generating at least one database of retail locations;

generating at least one database of media parameters, said database of media parameters containing data associated with mediums of exposure employed in marketing an entity;

generating at least one database of exposure factors associated with the entity;

executing at least one relational query that correlates the exposure factors with the media parameters; and developing at least one list of retail locations from said step of executing at least one relational query.

9. The computer useable medium according to claim 8, wherein said media exposure analyzing software, when executed by the processor, further causes the processor to carry out steps comprising:

generating a radio technical database;
generating a radio zip code map database;
generating a venue database;
generating a venue zip code map database;
generating a video technical database;
generating a video zip code map database;
generating a sales market database; and
generating a sales market zip code map database.

10. The computer useable medium according to claim 9, wherein said media exposure analyzing software, when executed by the processor, further causes the processor to carry out steps comprising:

generating a key market database;
generating a radio tracking database;
generating a video tracking database;
generating a tour database; and
generating a project database.

11. The computer useable medium according to claim 10, wherein said media exposure analyzing software, when executed by the processor, further causes the processor to carry out steps comprising:

executing a media exposure relational query that correlates exposure factors from the radio tracking database and the project database, with media parameters from the radio zip code map database to create first correlations, calculates an impact score for each of the first correlations, and produces a first data file containing result records;

executing a tour exposure relational query that correlates exposure factors from the tour database and the project database, with media parameters from the venue zip code map database to create second correlations, assigns an impact score for each of the second correlations, and produces a second data file containing result records;

executing a video exposure relational query that correlates exposure factors from the video tracking database and the project database, with media parameters from the video zip code map database to create third correlations, calculates an impact score for each of the third correlations, and produces a third data file containing result records; and executing a sales market relational query that correlates exposure factors from the key market database and the project database, with media parameters from the sales market zip code map database to create fourth correlations, assigns an impact score for each of the fourth correlations, and produces a fourth data file containing result records.

12. The computer useable medium according to claim 11, wherein said media exposure analyzing software, when executed by the processor, further causes the processor to carry out steps comprising:
executing a totaling query for the result records from the first data file to produce a fifth data file containing result records for predetermined field combinations;
executing a totaling query for the result records from the second data file to produce a sixth data file containing result records for predetermined field combinations; and
executing a totaling query for the result records from the third data file to produce a seventh data file containing result records for predetermined field combinations.

13. The computer useable medium according to claim 12, wherein said media exposure analyzing software, when executed by the processor, further causes the processor to carry out steps comprising:
combining the result records from the fourth, fifth, sixth, and seventh data files into an eighth data file containing result records; and
executing a totaling query for the result records from the eighth data file to produce a ninth data file containing result records for predetermined field combinations.

14. The computer useable medium according to claim 13, wherein said media exposure analyzing software, when executed by the processor, further causes the processor to carry out steps comprising:
executing a relational query that correlates the result records of the ninth data file with retail locations from the at least one database of retail locations to produce a tenth data file containing result records; and
calculating an indexed impact score for each of the result records of the tenth data file to produce a final data file.

15. A media exposure analyzing system comprising:
a computer useable medium; and
a computer device having a processor;
wherein the computer useable medium carries thereon media exposure analyzing software which, when executed by the processor of the computer device, causes the processor to carry out steps comprising:
generating at least one database of retail locations;
generating at least one database of media parameters, said database of media parameters containing data associated with mediums of exposure employed in marketing an entity;
generating at least one database of exposure factors associated with entity;
executing at least one relational query that correlates the exposure factors with the media parameters; and
developing at least one list of retail locations from said step of executing at least one relational query.

16. The media exposure analyzing system according to claim 15, wherein said media exposure software, when executed by the processor of the computer device, further causes the processor to carry out steps comprising:
generating a radio technical database;
generating a radio zip code map database;
generating a venue database;
generating a venue zip code map database;
generating a video technical database;
generating a video zip code map database;
generating a sales market database; and
generating a sales market zip code map database.

17. The media exposure analyzing system according to claim 16, wherein said media exposure software, when executed by the processor of the computer device, further causes the processor to carry out steps comprising:
generating a key market database;
generating a radio tracking database;
generating a video tracking database;
generating a tour database; and
generating a project database.

18. The media exposure analyzing system according to claim 17, wherein said media exposure software, when executed by the processor of the computer device, further causes the processor to carry out steps comprising:
executing a media exposure relational query that correlates exposure factors from the radio tracking database and the project database, with media parameters from the radio zip code map database to create first correlations, calculates an impact score for each of the first correlations, and produces a first data file containing result records;
executing a tour exposure relational query that correlates exposure factors from the tour database and the project database, with media parameters from the venue zip code map database to create second correlations, assigns an impact score for each of the second correlations, and produces a second data file containing result records;
executing a video exposure relational query that correlates exposure factors from the video tracking database and the project database, with media parameters from the video zip code map database to create third correlations, calculates an impact score for each of the third correlations, and produces a third data file containing result records; and
executing a sales market relational query that correlates exposure factors from the key market database and the project database, with media parameters from the sales market zip code map database to create fourth correlations, assigns an impact score for each of the fourth correlations, and produces a fourth data file containing result records.

19. The media exposure analyzing system according to claim 18, wherein said media exposure software, when executed by the processor of the computer device, further causes the processor to carry out steps comprising:
executing a totaling query for the result records from the first data file to produce a fifth data file containing result records for predetermined field combinations;
executing a totaling query for the result records from the second data file to produce a sixth data file containing result records for predetermined field combinations;
executing a totaling query for the result records from the third data file to produce a seventh data file containing result records for predetermined field combinations.

20. The media exposure analyzing system according to claim 19, wherein said media exposure software, when executed by the processor of the computer device, further causes the processor to carry out steps comprising:
combining the result records from the fourth, fifth, sixth, and seventh data files into an eighth data file containing result records;
executing a totaling query for the result records from the eighth data file to produce a ninth data file containing result records for predetermined field combinations;

executing a relational query that correlates the result records of the ninth data file with retail locations from the at least one database of retail locations to produce a tenth data file containing result records; and calculating an indexed impact score for each of the result records of the tenth data file to produce a final data file.

* * * * *